United States Patent [19]

Cok

[11] Patent Number: 4,642,678
[45] Date of Patent: Feb. 10, 1987

[54] SIGNAL PROCESSING METHOD AND APPARATUS FOR PRODUCING INTERPOLATED CHROMINANCE VALUES IN A SAMPLED COLOR IMAGE SIGNAL

[75] Inventor: David R. Cok, Rochester, N.Y.

[73] Assignee: Eastman Kodak Company, Rochester, N.Y.

[21] Appl. No.: 825,008

[22] Filed: Feb. 3, 1986

Related U.S. Application Data

[63] Continuation of Ser. No. 648,999, Sep. 10, 1984, abandoned, and a continuation of Ser. No. 676,910, Nov. 30, 1984, abandoned, which is a continuation of Ser. No. 648,998, Sep. 10, 1984, abandoned.

[51] Int. Cl.⁴ .................. H04N 9/077; H04N 9/07
[52] U.S. Cl. ........................................ 358/44; 358/43
[58] Field of Search .............. 358/41, 43, 44, 48, 358/78, 80

[56] References Cited

U.S. PATENT DOCUMENTS

| | | | |
|---|---|---|---|
| 3,971,065 | 7/1976 | Bayer | 358/44 |
| 4,054,906 | 10/1977 | Yamanaka | 358/43 |
| 4,065,785 | 12/1977 | Adcock et al. | 358/44 |
| 4,131,913 | 12/1978 | Yamanaka et al. | 358/44 |
| 4,176,373 | 11/1979 | Dillon et al. | 358/37 |
| 4,334,240 | 6/1982 | Franklin | 358/78 |
| 4,339,771 | 7/1982 | Morishita et al. | 358/41 |
| 4,367,492 | 1/1983 | Harada et al. | 358/44 |
| 4,437,112 | 3/1984 | Tanaka et al. | 358/44 |
| 4,605,956 | 8/1986 | Cok | 358/44 |

FOREIGN PATENT DOCUMENTS

| | | | |
|---|---|---|---|
| 79433 | 7/1978 | Japan | 358/44 |
| 79435 | 7/1978 | Japan | 358/44 |
| 86982 | 5/1984 | Japan | 358/44 |

*Primary Examiner*—James J. Groody
*Assistant Examiner*—Randall S. Svihla
*Attorney, Agent, or Firm*—Thomas H. Close

[57] ABSTRACT

A signal processing method and apparatus for processing a sampled color image signal of the type having luminance values and chrominance values representing a highly sampled luminance component and less highly sampled chrominance components to produce interpolated chrominance values between sampled chrominance values is characterized by producing hue values at neighboring chrominance component sample locations as a function of a luminance value and the chrominance value at the neighboring locations; producing a signal representing an interpolated hue value as a function of neighboring hue values; and producing a signal representing an interpolated chrominance value as a function of the interpolated hue value and a luminance value at the interpolated location. The signal processing method reduces color fringing in an image reproduced from the sampled image signal without introducing unwanted hue shifts.

7 Claims, 7 Drawing Figures

SIGNAL PROCESSING METHOD AND APPARATUS FOR PRODUCING INTERPOLATED CHROMINANCE VALUES IN A SAMPLED COLOR IMAGE SIGNAL

This is a continuation of U.S. patent application Ser. No. 648,999 filed Sept. 10, 1984, now abandoned, and U.S. patent application Ser. No. 676,910 filed Nov. 30, 1984, now abandoned, which is a continuation of U.S. patent application Ser. No. 648,998 filed Sept. 10, 1984, now abandoned.

TECHNICAL FIELD

The invention relates to signal processing methods and apparatus for processing a sampled color image signal of the type having a highly sampled color component and a less highly sampled color component, and more particularly to such signal processing methods for providing interpolated values between sampled values of the less highly sampled color component.

BACKGROUND ART

Some color image sensing apparatus produce a sampled color image signal by sampling one color component of an image at a higher spatial sampling frequency than other color components. The more highly sampled colored component usually corresponds to the portion of the spectrum to which the human eye is most sensitive to image detail, and is often called the luminance component. The term "luminance component" as used herein refers to the most highly sampled color component, whether it be green, white, or some other color.

The less highly sampled color components, are often referred to as chrominance components and may comprise, for example, red and blue, or cyan and yellow. The term "chrominance component" as used herein refers to a less highly sampled color component of an image regardless of the particular color.

In some color image sensing apparatus of this type, one image sensor samples the luminance component of the image, and another image sensor samples two chrominance components. The image sensing elements on the image sensor that samples the chrominance components alternate between one color and the other.

In other color image sensing apparatus, a single image sensor is employed to sense the luminance and two chrominance components of the image. The image sensing elements of the image sensor alternate between elements for sampling luminance and elements for sampling one and then the other of the chrominance components.

When reconstructing an image from the sampled color image signals produced by these color image sensors, values of the luminance and chrominance components are provided for each sample location. This is generally accomplished by using some form of linear interpolation between sample values of the less highly sampled color components. Reconstruction of the color image by linear interpolation of the chrominance components results in the appearance of colored fringes in areas of image detail, due to a deviation of the interpolated values from the actual color values existing in the original image.

It is known to employ signal processing to reduce the appearance of these colored fringes in the reconstructed images. In U.S. Pat. No. 4,176,373, issued Nov. 27, 1979, Dillon and Bayer disclose analog signal processing apparatus for interpolating values between the sampled luminance and chrominance values in a sampled color image signal produced by a single image sensor having a checkerboard pattern of luminance (green) image sensing elements interspersed with chrominance component (red and blue) image sensing elements. The apparatus performs a linear interpolation between chrominance component samples, then adds a high spatial frequency portion of the luminance signal to the interpolated chrominance component signals. Adding the high spatial frequency portion of the luminance signal to the interpolated chrominance component signals reduces the appearance of color fringes in areas of image detail by driving the high spatial frequency portion of the image signal towards a neutral color. Although the signal processing disclosed by Dillon and Bayer is effective to reduce the appearance of color fringing in the detailed areas of the image, the method achieves this object at the expense of altering the sampled values of the chrominance component signals of the image signal. As a result, some hue shifts are introduced in areas of image detail even as the appearance of color fringing is reduced.

The object of the present invention is to provide a signal processing method for reducing the appearance of colored fringes in areas of fine image detail without introducing unwanted hue shifts.

DISCLOSURE OF THE INVENTION

The above-noted object is achieved by producing neighboring hue values representing a hue component of the image at neighboring chrominance component sample locations as a function of a luminance value and a chrominance value at the neighboring locations; producing an interpolated hue value representing the hue component of the image at an interpolation location as a function of the neighboring hue values; and producing an interpolated chrominance value as a function of the interpolated hue value and a luminance value at the interpolation location.

As used herein, the term "hue value" refers to a quantity relating the value of a less highly sampled color (chrominance component) to the value of the more highly sampled color (luminance component). By interpolating the hue value and deriving the interpolated chrominance value from the interpolated hue value, hues are allowed to change only gradually, thereby reducing the appearance of colored fringes in areas of image detail without introducing unwanted hue shifts.

In one embodiment of the invention, the sampled color image signal luminance and chrominance values are linear exposure values, the hue values are formed as the ratio of the sampled chrominance value to the luminance value at the respective chrominance component sample locations, and the interpolated chrominance value is formed as the product of the interpolated hue value and the luminance value at the interpolation location.

In another embodiment of the invention, the sampled color image signal luminance and chrominance values are logarithmic density values, the hue value is formed as the difference between the sampled chrominance values and the luminance values at the respective chrominance component sample locations, and the interpolated chrominance value is formed as the sum of the interpolated hue value and the luminance value at the interpolation location.

BRIEF DESCRIPTION OF THE DRAWINGS

Modes of carrying out the invention are described below, with reference to the drawings wherein.

MODES OF CARRYING OUT THE INVENTION

Figure 1:
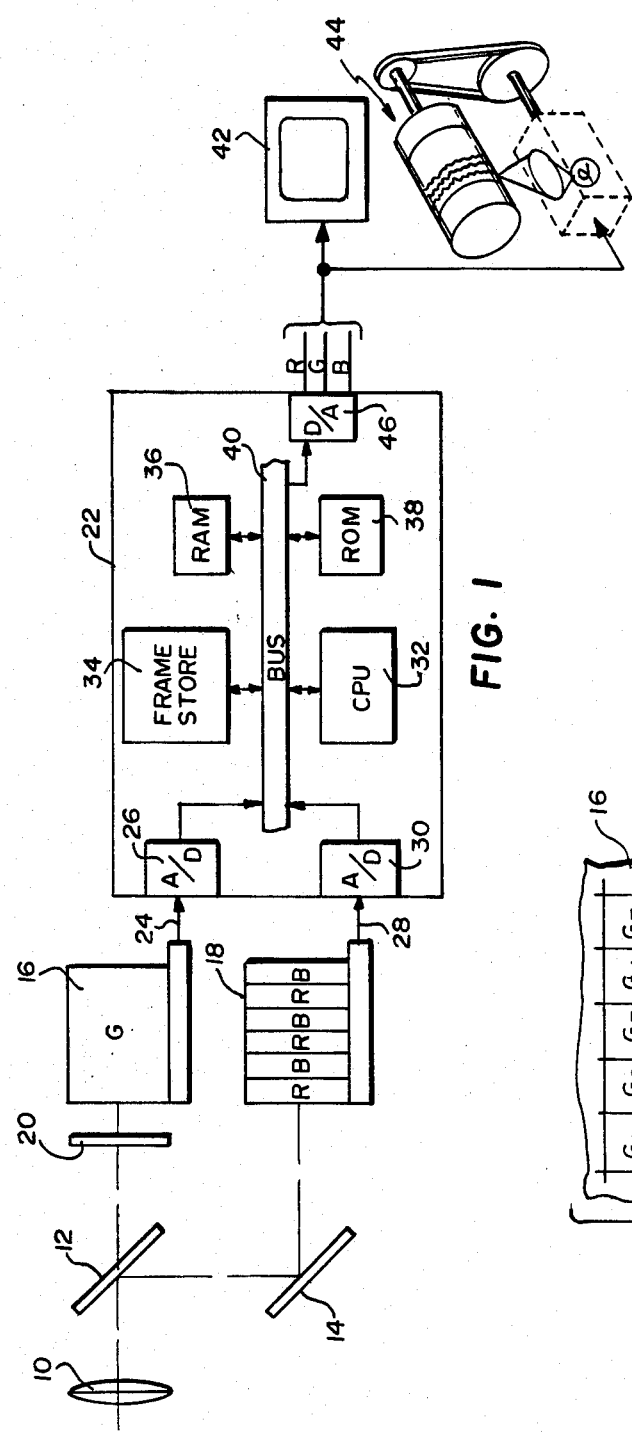
FIG. 1 schematically shows apparatus having two image sensors for producing, processing, and displaying a sampled color image signal.

Apparatus for generating a sampled color image signal, processing the sampled color image signal, and displaying the processed sampled color image signal are shown in FIG. 1. The apparatus includes an optical system having a lens 10, a beam splitter 12 and a mirror 14 for forming an image on a pair of image sensors 16 and 18, such as CCD image sensing arrays. Image sensor 16 senses the luminance component of the image, and is provided with a uniform green color filter 20. Image sensor 18 senses the chrominance components of the image and is provided with a striped color filter array having alternate red and blue vertical stripes labeled R and B in the figure.

The sampled analog luminance signal produced by image sensor 16 is supplied to a digital computer 22 on line 24 through an analog-to-digital converter 26. The sampled analog chrominance component signals produced by image sensor 18 are supplied to the computer 22 on line 28 through an analog-to-digital converter 30.

The digital computer 22 performs the signal processing according to the invention to interpolate chrominance values between sampled chrominance values in the color image signal.

The digital computer 22 includes a central processing unit 32, a frame store 34 for storing the unprocessed and processed digital color image signals and random access and read-only memories RAM and ROM 36 and 38 for storing the control programs for the computer. The digital image signals are supplied to the computer on data bus 40. Processed image signals are supplied to a display device such as a CRT 42 or graphic arts scanner 44 via digital-to-analog converter 46.

Although the elements of the apparatus are shown physically connected in FIG. 1, the elements may be physically separated and the signals carried between the elements via storage media such as magnetic tape or disc. For example, the sampled analog signals from the image sensor may be recorded directly on a video magnetic tape recorder and later supplied to the computer for signal processing. Similarly, the processed sampled image signals may be recorded for later display. Although the invention was reduced to practice using a general purpose digital computer, it will be obvious to one skilled in the art that a programmed microprocessor or custom-designed integrated circuit can be employed to practice the invention.

Figure 2:
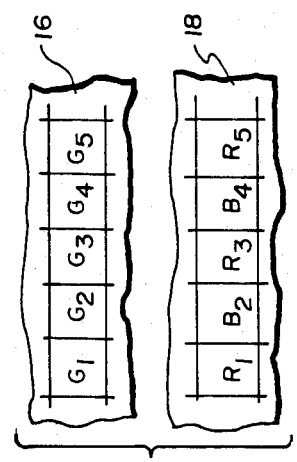
FIG. 2 is a diagram useful in describing the signal processing method applied to the sampled color image signal produced by the image sensing apparatus shown in FIG. 1.

The signal processing method performed by computer 22 will now be described with reference to FIG. 2. FIG. 2 shws a portion of a horizontal line of image sensing locations labeled $G_1$–$G_5$ on luminance image sensor 16, and a portion of the corresponding horizontal line on the chrominance image sensor 18. The purpose of the signal processing method is to provide interpolated chrominance values (e.g. $B_1$, $R_2$, $B_3$, etc.) in such a manner that color fringes are reduced in areas of image detail without introducing hue shifts in these areas. This requires that image intensity information be faithfully reproduced while only smooth hue changes are allowed from one sampling location to the next.

In an image of uniform hue, the values of the luminance (G) and one of the chrominance components (for example the red component R) at one sample location (Rx, Gx) are related to the values (Ry, Gy) at another location as follows:

$$Ry/Rx = Gy/Gx \tag{1}$$

in exposure space. If Ry represents an unknown chrominance value at an interpolation location, from equation (1), $$Ry = Gy \cdot (Rx/Gx) \tag{2}$$

where Rx/Gx represents the measured value of the hue component at another sample location.

In an image that does not have a uniform hue, as in a normal color image, smoothly changing hues are assured by interpolating the hue values between neighboring chrominance component sample locations. Thus, the interpolated chrominance value R' becomes:

$$R' = G \cdot (R/G)' \tag{3}$$

where the primed hue value represents an interpolated hue value between neighboring chrominance component sample locations, and the luminance value G is the luminance value at the interpolation location.

This signal processing method is applied to the signal produced by the apparatus shown in FIGS. 1 and 2, by employing linear interpolation between the hue values at neighboring chrominance component sample locations. Interpolated chrominance values in exposure space are obtained as follows:

$$R'_2 = G_2 \cdot \left( \frac{R_1}{G_1} + \frac{R_3}{G_3} \right) / 2 \tag{4}$$

and similarly for the other chrominance value $$B'_3 = G_3 \cdot \left( \frac{B_2}{G_2} + \frac{B_4}{G_4} \right) / 2 \tag{5}$$

Alternatively, the hue values can be interpolated in density space. In density space, equation (3) becomes:

$$\log R' = \log G + (\log R - \log G)' \tag{6}$$

Where the primed quantity in parentheses indicates an interpolated hue value between neighboring chrominance component sample locations. Applying linear interpolation to the signals represented in FIG. 2, the interpolated chrominance values in density space are obtained as follows:

$$\log R'_2 = \log G_2 + [(\log R_1 - \log G_1) + (\log R_3 - \log G_3)]/2 \quad (7)$$

and similarly for the other chrominance values, $$\log B'_3 = \log G_3 + [(\log B_2 - \log G_2) + (\log B_4 - \log G_4)]/2 \quad (8)$$

It should be noted that equations (7) and (8) will provide slightly different results than will equations (4) and (5) since $\log [(A+B)/2]$ is not exactly the same as $(\log A + \log B)/2$, but is merely an approximation thereof.

Figure 3:
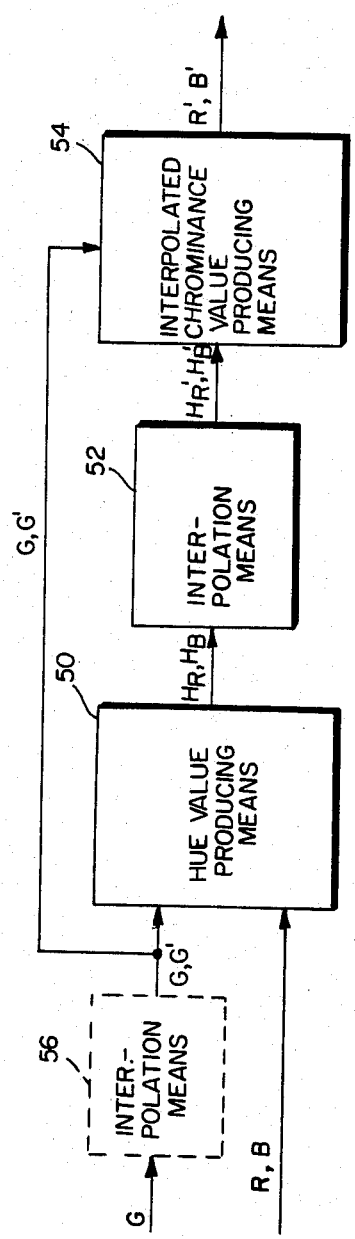
FIG. 3 is a block diagram illustrating the function performed by the signal processing method of the present invention.

FIG. 3 is a block diagram illustrating the essential functions that are performed by the digital computer 22 to accomplish the signal processing method of the present invention. Hue value signal producing means 50 receives the sampled luminance value G and the sampled chrominance values R, B and produces hue values $H_R$, $H_B$, by dividing the chrominance values by the luminance values as described above. Alternatively, in performing the operations in density space, the logs of the luminance values are subtracted from the logs of the chrominance values as described above.

Interpolation means 52 receives the hue values $H_R$, $H_B$ and produces interpolated hue values $H_R'$, $H_B'$ representing the hue values at the interpolation locations. As disclosed above, the interpolation performed is preferably a linear interpolation. Alternatively, higher order interpolation may be performed. Means 54 for producing interpolated chrominance values receives the luminance value G and the interpolated hue values $H_R'$, $H_B'$ and produces the interpolated chrominance values R', B' by multiplying the luminance value by the interpolated hue value as described above.

Alternatively, in density space, the log of the luminance value G is added to the log of the interpolated hue values $H_R'$, $H_B'$ to produce the interpolated chrominance values R', B'.

Figure 4:
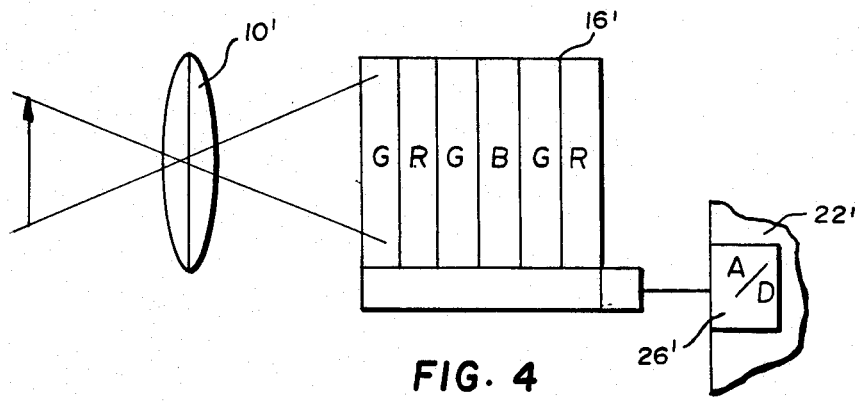
FIG. 4 schematicaly shows apparatus having a single image sensor for producing a sampled color image signal.

In the previous example, the luminance values at every location were actual values measured at each sample location by image sensor 16. FIG. 4 shows an example of a single-chip, color image sensor where the luminance component sampling locations in the horizontal direction are separated by chrominance component sampling locations. The single-chip color image sensor 16' is provided with a vertically striped color filter array having the alternating pattern green, red, green, blue (G,R,G,B) of color filters. Other elements of the apparatus for processing and displaying the signal are the same as those shown in FIG. 1. Elements similar to those in FIG. 1 are numbered with primes (').

Figure 5:
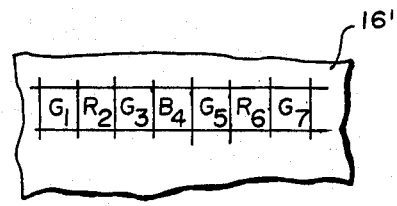
FIG. 5 is a diagram useful in describing the signal processing method applied to the signal produced by the image sensing apparatus shown in FIG. 4.

When the signal processing method is applied to the signals produced by the image sensor 16', luminance values (G) for the chrominance component sampling locations (R,B) are supplied by an appropriate form of interpolation. FIG. 5 shows a portion of one line of image sensing locations on the image sensor 16'. The interpolated luminance value at the chrominance component sampling location $R_2$ could be generated, for example, by linear interpolation as follows:

$$G'_2 = (G_1 + G_3)/2 \quad (9)$$

where the prime indicates that the luminance value is an interpolated value. The other luminance values are obtained in a similar manner.

Using the interpolated luminance values, the signal processing method of the present invention is applied to the signal in exposure space to provide interpolated chrominance values as follows:

$$R'_3 = G_3 \cdot \left( \frac{R_2}{G'_2} + \frac{R_6}{G'_6} \right) /4 \quad (10)$$

$$R'_4 = G'_4 \cdot \left( \frac{R_2}{G'_2} + \frac{R_6}{G'_6} \right) /2 \quad (11)$$

$$R'_5 = G_5 \cdot \left( \frac{R_2}{G'_2} + \frac{3R_6}{G'_6} \right) /4 \quad (12)$$

where the primed luminance values ($G'_n$) represent interpolated luminance values. The blue chrominance values are generated in a similar manner. In the block diagram of FIG. 3, an interpolation means 56 is shown in phantom. This interpolation means provides the interpolated luminance values $G'_n$.

In density space, the signal processing method is applied as follows to generate red chrominance values:

$$\log R'_3 = \log G_3 + [3(\log R_2 - \log G'_2) + (\log R_6 - \log G'_6)]/4 \quad (13)$$

$$\log R'_4 = \log G'_4 + [(\log R_2 - \log G'_2) + (\log R_6 - \log G'_6)]/2 \quad (14)$$

$$\log R'_5 = \log G_5 + [(\log R_2 - \log G'_2) + 3(\log R_6 - \log G'_6)]/4 \quad (15)$$

The blue chrominance values are generated in a similar fashion.

Figure 6:
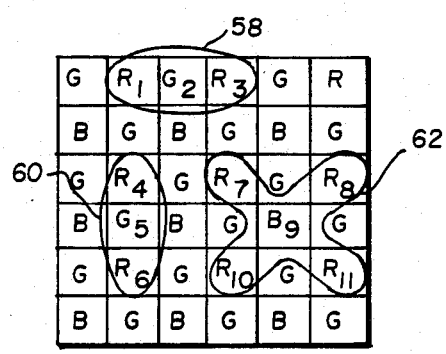
FIG. 6 is a diagram showing an alternative color sampling pattern for the single image sensor shown in FIG. 4.

Another well known filter array pattern for a single-chip color image sensor is the checkerboard pattern. One checkerboard pattern, often called a Bayer array after the inventor, is described in U.S. Pat. No. 3,971,065, issued July 20, 1976, to B. E. Bayer. A portion of a Bayer array pattern is shown in FIG. 6 where some of the sample locations are numbered for purposes of the following description.

In the Bayer array, each chrominance component sampling location is surrounded by four immediately adjacent luminance sampling locations. One appropriate way of generating interpolated luminance values is to average these four nearest neighbors as follows:

$$G' \sum_{n=1}^{4} G_n/4 \quad (16)$$

where the prime indicates are interpolated value, and $G_n$ are the values of the nearest neighbors.

When applying the signal processing method of the present invention to the signals produced by an image sensor having a Bayer array sampling pattern, there are three different sampling configurations to consider. In the first configuration, indicated by the region labeled 58 in FIG. 6, the measured chrominance values lie on either side of the interpolation location. In the second configuration, labeled 60 in FIG. 6, the measured chrominance values lie above and below the interpolation location, and in the third configuration, indicated by the area labeled 62 in FIG. 6, the measured chrominance values lie at the four corners of the interpolation location.

In exposure space, the signal processing method is applied to the signal produced by the Bayer array as follows.

For the first configuration:

$$R'_2 = G_2 \cdot \left( \frac{R_1}{G'_1} + \frac{R_3}{G'_3} \right) / 2 \qquad (17)$$

for the second configuration, $$R'_5 = G_5 \cdot \left( \frac{R_4}{G'_4} + \frac{R_6}{G'_6} \right) / 2 \qquad (18)$$

and for the third configuration, $$R'_9 = G'_9 \cdot \left( \frac{R_7}{G'_7} + \frac{R_8}{G'_8} + \frac{R_{10}}{G'_{10}} + \frac{R_{11}}{G'_{11}} \right) / 4 \qquad (19)$$

where the primed luminance values indicate interpolated values. The interpolated values of the other chrominance component (e.g. the blue component) are produced in a similar manner.

In density space, the signal processing method is applied as follows:

$$\log R'_2 = \log G_2 + [(\log R_1 - \log G'_1) + (\log R_3 - \log G'_3)]/2 \qquad (20)$$

$$\log R'_5 = \log G_5 + [(\log R_4 - \log G'_4) + (\log R_6 - \log G'_6)]/2 \qquad (21)$$

$$\log R'_9 = \log G'_9 + [(\log R_7 - \log G'_7) + (\log R_8 - \log G_{408}) + (\log R_{10} - \log G'_{10}) + (\log R_{11} - \log G'_{11})]/4 \qquad (22)$$

and the other chrominance values (e.g. blue component) are determined in a similar manner.

Figure 7:
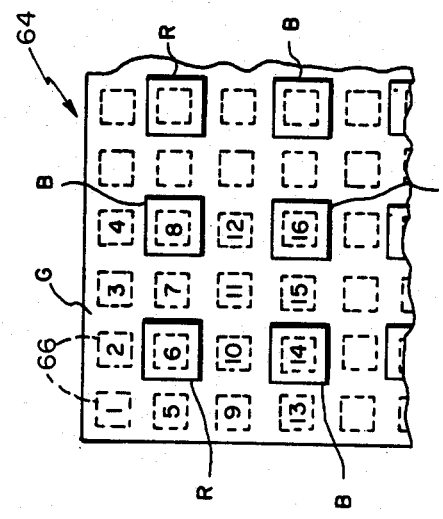
FIG. 7 is a diagram showing an alternative color sampling pattern wherein 75% of the image sensing elements are luminance component sensing elements.

In another two-dimensional array color filter pattern, 75% of the image sampling locations are luminance sampling locations, and each chrominance sampling location is completely surrounded by luminance sampling locations. A portion of such a 75% luminance component sampling array 64 is shown in FIG. 7 where some of the sample locations 66 are numbered for purposes of the following description. The signal processing method of the present invention is applied to the signals produced by the array shown in FIG. 7 as follows.

First, interpolated luminance values are determined at positions 6 and 16, for example by taking the average of the eight luminance values surrounding each chrominance component sample location.

In exposure space, a red hue value HR is determined for positions 6 and 16 as follows:

$$HR_6 = R_6/G'_6$$

where $G'_6$ is the interpolated luminance value, and similarly for $HR_{16}$.

The hue values for the sample locations between the chrominance component sample locations are determined for example by linear interpolation as follows:

$$HR'_{11} = (HR_6 + HR_{16})/2$$

Finally, the interpolated chrominance values are found by multiplying the interpolated hue values by the luminance values as follows:

$$R'_{11} = HR'_{11} \cdot G_{11}$$

The values of the other chrominance component (blue) are reconstructed in a similar manner.

In density space, the signal processing method is applied as follows:

$$\log R'_{11} = \log G_{11} + [(\log R_6 - \log G'_6) + (\log R_{16} - \log G'_{16})]/2$$

The values of the other chrominance component are reconstructed in a similar manner.

By employing this method of interpolation, the red and blue chrominance values are reconstructed without noticeable degradation.

A variety of photographic images were sampled to produce sampled color image signals, and the signal processing method according to the present invention was applied to the sampled colored image signals. The images reproduced from the processed sampled color image signals were found to have reduced color fringing in areas of image detail and were free from any noticeable hue shifts in these areas. A definite improvement was noted over images reproduced from signals processed according to prior art methods. Although the interpolated chrominance values produced when the image signals were processed in exposure space varied slightly from the values produced when the image signals were processed in density space, the differences in the appearance of the images reproduced from the processed signals were not significant enough so that one signal processing space could be determined to be preferable over the other.

Although the particular manner of interpolating the luminance values is not an essential feature of the general inventive concept, when processing a signal from a single chip color image sensor having a checkerboard-type sampling pattern like the Bayer array, best results have been achieved with a pattern recognition interpolation method of the type disclosed in copending patent application Ser. No. 649,001 entitled "Signal Processing Method and Apparatus for Sampled Image Signals" filed Sept. 10, 1984, by the present inventor. In the pattern recognition interpolation method, a plurality of interpolation routines appropriate for producing interpolated signal values that complete a respective plurality of known geometrical image features are employed. A neighborhood of sampled luminance values is examined to determine which geometrical image feature is represented by the local neighborhood of sample values, and the appropriate interpolation routine is used to produce the interpolated luminance value.

Although the invention has been described as being performed by signal processing apparatus having a full frame store, it will be apparent to one skilled in the art that the signal processing apparatus needs to store only a few lines of the image signal at one time in order to perform the signal processing method.

Furthermore, although the invention was reduced to practice using a general purpose digital computer, it will be apparent to one skilled in the art, that a programmed microprocessor, or custom-designed integrated circuits can be used to practice the invention.

ADVANTAGES AND INDUSTRIAL APPLICABILITY

The signal processing method according to the present invention has the advantage of reducing color fringing without introducing hue shifts in areas of image detail in an image reproduced from the processed sampled color image signal. The invention is useful in amateur or professional video and still imaging apparatus employing sample-type color image sensors, and in graphic arts apparatus for reproducing images from sampled color image signals.

I claim:

1. A method of processing a sampled color image signal having luminance values representing a luminance component of a color image sampled at a high spatial frequency and chrominance values representing a chrominance component of the color image sampled at a relatively lower spatial frequency for producing an interpolated chrominance value representing the chrominance component of the color image at an interpolation location between two neighboring chrominance component sampling locations, comprising the steps of:
   (a) producing neighboring hue values representing a hue component of the image at the two neighboring chrominance component sampling locations as a function of a chrominance value and a luminance value at each of the two neighboring chrominance component sampling locations;
   (b) producing an interpolated hue value representing the hue component of the color image at the interpolation location by interpolating between the neighboring hue values; and
   (c) producing the interpolated chrominance value as a function of the interpolated hue value and a luminance value at the interpolation location.

2. The method claimed in claim 1, wherein the luminance and chrominance values of the sampled color image signal are linear exposure values, the neighboring hue values are produced by forming the ratio of the chrominance value to the luminance value at the respective neighboring chrominance component sampling locations, the interpolated hue value is produced by linear interpolation between the neighboring hue values, and the interpolated chrominance value is produced by forming the product of the interpolated hue value and the luminance value at the interpolation location.

3. The method claimed in claim 1, wherein the luminance and chrominance values of the sampled color image signal are logarithmic density values, the neighboring hue values are produced by forming the difference between the chrominance value and the luminance value at the respective neighboring chrominance component sampling locations, the interpolated hue value is produced by linear interpolation between the neighboring hue values, and the interpolated chrominance value is produced by forming the sum of the interpolated hue value and the luminance value at the interpolation location.

4. Apparatus for processing a sampled color image signal having luminance values representing a luminance component of a color image sampled at a high spatial frequency and chrominance values representing two or more chrominance components of the color image sampled at a relatively lower spatial frequency, sampling locations of the chrominance components being spatially separate from each other for producing an interpolated chrominance value representing one of the chrominance components of the color image at an interpolation location between two neighboring sampling locations of the one chrominance component, comprising:
   (a) means responsive to luminance and chrominance values at each of the two neighboring chrominance component sampling locations for producing neighboring hue values representing a hue component of the color image at the two neighboring chrominance component sampling locations;
   (b) means responsive to the neighboring hue values for producing an interpolated hue value representing the hue component of the color image at the interpolation location; and
   (c) means responsive to the interpolated hue value and a luminance value at the interpolation location for producing the interpolated chrominance value.

5. The apparatus claimed in claim 4, wherein the luminance and chrominance values of the sampled color image signal are linear exposure values, the neighboring hue values are produced by forming the ratio of the chrominance value to the luminance value at the respective neighboring chrominance component sampling locations, the interpolated hue value is produced by linear interpolation between the neighboring hue values, and the interpolated chrominance value is produced by forming the product of the interpolated hue value and the luminance value at the interpolation location.

6. The apparatus claimed in claim 4, wherein the luminance and chrominance values of the sampled color image signal are logarithmic density values, the neighboring hue values are produced by forming the difference between the chrominance value and the luminance value at the respective neighboring chrominance component sampling locations, the interpolated hue value is produced by linear interpolation between the neighboring hue values, and the interpolated chrominance value is produced by forming the sum of the interpolated hue value and the luminance value at the interpolation location.

7. The apparatus claimed in claim 4, wherein the sampled color image signal represents a color image sampled in a two-dimensional sampling pattern having 75% luminance component sampling locations and 25% chrominance component sampling locations, with each chrominance component sampling location being surrounded by luminance component sampling locations.

* * * * *